(12) United States Patent
Kumar et al.

(10) Patent No.: US 6,986,970 B1
(45) Date of Patent: Jan. 17, 2006

(54) COLLOIDAL ELECTROLYTES

(75) Inventors: Binod Kumar, Dayton, OH (US); Stanley J. Rodrigues, Dayton, OH (US)

(73) Assignee: University of Dayton, Dayton, OH (US)

( * ) Notice: Subject to any disclaimer, the term of this patent is extended or adjusted under 35 U.S.C. 154(b) by 484 days.

(21) Appl. No.: 10/412,373

(22) Filed: Apr. 11, 2003

Related U.S. Application Data

(60) Provisional application No. 60/372,334, filed on Apr. 12, 2002.

(51) Int. Cl.
*H01M 6/16* (2006.01)

(52) U.S. Cl. ............... 429/324; 429/188; 429/325
(58) Field of Classification Search ............ 429/188, 429/324, 325
See application file for complete search history.

(56) References Cited

U.S. PATENT DOCUMENTS

| | | | |
|---|---|---|---|
| 4,207,097 A | | 6/1980 | Fukuda et al. |
| 4,262,068 A | | 4/1981 | Kono et al. |
| 4,301,219 A | | 11/1981 | Kosuga |
| 4,810,595 A | * | 3/1989 | Kahara et al. ............ 429/16 |
| 5,141,827 A | * | 8/1992 | Fritz et al. ............ 429/304 |
| 5,202,196 A | | 4/1993 | Wang et al. |
| 6,132,905 A | | 10/2000 | Kumar et al. |
| 6,190,806 B1 | | 2/2001 | Kumar et al. |
| 6,218,052 B1 | | 4/2001 | Wang |

OTHER PUBLICATIONS

Kumar, B. et al., "Ionic Conductivity of Polymer-Ceramic Composites" J. Electrochem. Soc. 148 (10) A1191-A1195 (2001).
Kumar, B. et al., "An Electrochemical Study of PEO: LiBF-glass Composite Electrolytes" J. Pow. Sources 47, 63-78 (1996).
Munichandraiah N. et al., "Ionic Conductivity and Lithium Electrode Stability in Hydrine: LiBF Elastomers" J. Appl. Electrochem. 24, 1066-1072 (1994).

* cited by examiner

*Primary Examiner*—Dah-Wei Yuan
(74) *Attorney, Agent, or Firm*—Dinsmore & Shohl LLP

(57) ABSTRACT

A colloidal electrolyte for an electrochemical device. The colloidal electrolyte includes a liquid electrolyte selected from liquid organic electrolytes, or liquid inorganic electrolytes free of sulfuric acid; and a ceramic particle phase dispersed in the liquid electrolyte, wherein the colloidal electrolyte has increased conductivity in the electrochemical device compared to the conductivity of the liquid electrolyte alone. The colloidal electrolytes will suppress flammability and flowability.

27 Claims, 8 Drawing Sheets

COLLOIDAL ELECTROLYTES

CROSS REFERENCE TO RELATED APPLICATIONS

This application claims the benefit of U.S. Provisional Application No. 60/372,334 filed Apr. 12, 2002.

BACKGROUND OF THE INVENTION

The present invention relates to electrolytes used in electrochemical devices, and more particularly, to colloidal electrolytes having increased conductivity in the electrochemical device compared to the conductivity of the liquid electrolyte alone.

The use of liquid electrolytes in electrochemical devices presents a number of difficulties. First, the electrolytes are often corrosive, and they can be difficult to contain. For example, lead storage batteries use sulfuric acid as the electrolyte. If the sulfuric acid corrodes through the container, it can create environmental problems. As a result, attempts have been made to immobilize liquid electrolytes. These efforts have had varying degrees of success. In addition, many organic electrolytes are flammable.

Furthermore, the performance of electrochemical devices can suffer under low or high temperature conditions. For example, cold temperatures reduce the conductivity of the current solid or liquid electrolytes used in lithium batteries. At temperatures less than −20° C., some liquid electrolytes freeze, resulting in a major drop in ionic conductivity and capacity. In addition, cold temperatures slow down the charge transfer reaction kinetics at the electrode-electrolyte interfaces. Thus, when liquid electrolytes are used in an electrochemical device such as a lithium ion battery, the rate capability and performance of the battery is slowed as a result of the effect of the cold temperature on the liquid electrolytes. Under high temperature conditions, liquid electrolytes can suffer from instability and degradation, which is believed to be due primarily to the decomposition of the lithium salt, such as $LiPF_6$.

Attempts have been made to decrease the effect of cold temperatures on liquid electrolytes and, consequently, to improve the performance of the electrochemical devices containing them. For example, insulating blankets, heaters, and phase change materials have been developed to keep liquid electrolytes warm in lithium ion and other batteries. Although these efforts have helped to improve the conductivity of the electrolytes and the charge transfer reaction kinetics of lithium ion batteries under cold temperature conditions, they increase the cost per kilowatt-hour, and they lower the energy and power densities of the battery.

Thus, there is a need for an electrolyte composition which can maintain good conductivity under a wide range of temperatures.

SUMMARY OF THE INVENTION

The present invention meets this need by providing a colloidal electrolyte for an electrochemical device. Electrochemical devices include, but are not limited to, fuel cells, batteries of various types, including lithium batteries, electrochemical sensors, and electrochromic devices. The colloidal electrolyte provides improved charge transfer reaction kinetics and rate capability. In addition, the colloidal electrolyte exhibits reduced thermal degradation when subjected to high temperatures.

The colloidal electrolyte of the present invention includes a liquid electrolyte selected from liquid organic electrolytes, or liquid inorganic electrolytes free of sulfuric acid; and a ceramic particle phase dispersed in the liquid electrolyte, wherein the colloidal electrolyte has increased conductivity in the electrochemical device compared to the conductivity of the liquid electrolyte.

When the colloidal electrolyte is to be used in a lithium battery, the liquid electrolyte further comprises a lithium salt. Suitable lithium salts include, but are not limited to, lithium halides and complex fluorides, such as lithium hexafluorophosphate, or lithium tetrafluoroborate.

Suitable liquid organic electrolytes include, but are not limited to, ethylene carbonate, diethyl carbonate, polypropylene carbonate, or mixtures thereof.

Suitable liquid inorganic electrolytes free of sulfuric acid include, but are not limited to, potassium hydroxide, phosphoric acid, or molten carbonate.

The average size of the ceramic particles is generally in the range of about 1 to about 10,000 nm. Suitable ceramic particles include, but are not limited to, MgO, ZnO, SrO, BaO, CaO, $ZrO_2$, $Al_2O_3$, $SiO_2$, SiC, $Si_3N_4$, BN, $BaTiO_3$, or mixtures thereof.

The liquid electrolyte is generally present in an amount of between about 3 to about 98 wt % and the ceramic particle phase is generally present in an amount of between about 97 to about 2 wt %.

Another aspect of the invention is an electrochemical device containing the claimed colloidal electrolyte. Still another aspect of the invention is a lithium rechargeable battery containing the claimed colloidal electrolyte.

DETAILED DESCRIPTION OF THE INVENTION

The presence of the ceramic particles in the colloidal electrolytes of the present invention improves the mechanical and thermal properties of the electrolyte. The colloidal electrolytes display increased conductivity in the electrochemical device compared to the conductivity of the liquid electrolyte alone. In addition, the colloidal electrolyte has increased viscosity which reduces the flowability of the electrolyte, making it easier to contain. The presence of the ceramic particles in organic electrolytes also reduces the flammability of the organic electrolytes. Finally, the diffusion and flow of gases through the liquid electrolyte, which would be detrimental to the electrochemical performance of a fuel cell, is are reduced by the presence of the ceramic particles.

Figure 1:
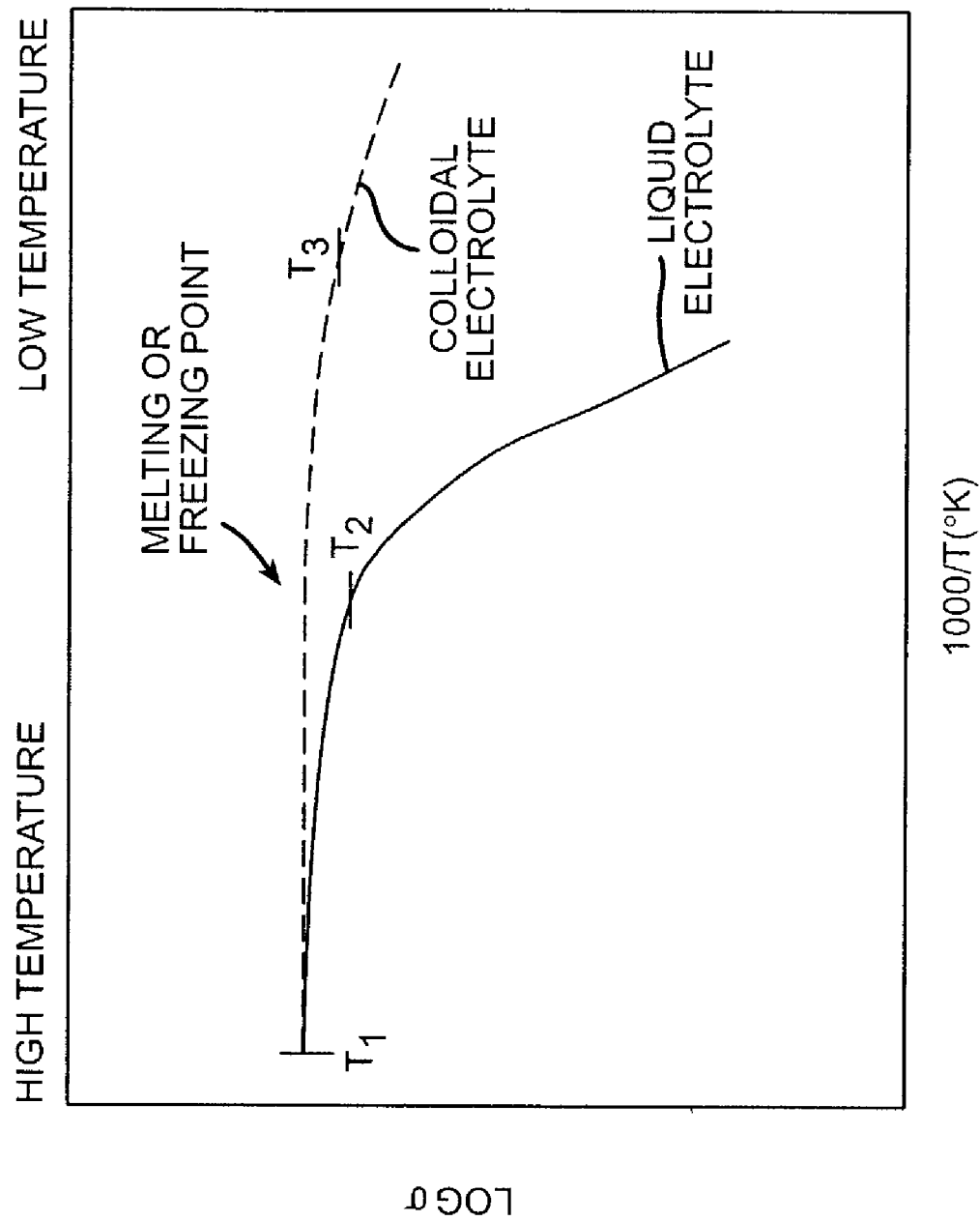
FIG. 1 is a schematic comparing the conductivity of a liquid electrolyte and a colloidal electrolyte of the present invention.

FIG. 1 is a schematic showing the effect of the colloidal electrolyte of the present invention on conductivity. The conductivity of the liquid electrolyte drops slowly as the temperature is reduced from $T_1$ to $T_2$ ($T_2$ is near the freezing point of the liquid electrolyte). It then drops quickly after reaching temperature $T_2$, yielding a useful operating range for the liquid electrolyte of $T_1-T_2$.

In contrast, the conductivity of the colloidal electrolyte of the present invention drops slowly over a much wider temperature range, from $T_1$ to $T_3$. Thus, the useful operating range of the colloidal electrolyte of the present invention is $T_1-T_3$, which is greater than the operating range for the liquid electrolyte alone, $T_1-T_2$. The increase in the useful operating range and the level of improvement in conductivity vary based on the particular liquid electrolyte and ceramic particles used.

The colloidal electrolyte of the present invention includes a ceramic particle phase dispersed in a liquid electrolyte. The liquid electrolyte can be liquid organic electrolytes, or liquid inorganic electrolytes free of sulfuric acid.

Liquid organic electrolytes which can be used in the present invention include, but are not limited to, lithium salts dissolved in organic solvents. Suitable organic solvents include, but are not limited to, ethylene carbonate, diethyl carbonate, polypropylene carbonate, sulfolane, dimethylsulfoxide, acetonitrile, tetrahydrofuran, or mixtures thereof. These liquid organic electrolytes are useful for lithium batteries.

Liquid inorganic electrolytes free of sulfuric acid can also be used. Liquid inorganic electrolytes include, but are not limited to, potassium hydroxide, phosphoric acid, or molten carbonate. These liquid inorganic electrolytes can be used in fuel cells. When employed alone as an electrolyte, potassium hydroxide can be used at temperatures in the range of from about 100° C. to about 250° C., phosphoric acid can be used in the range of from about 150° C. to about 250° C., and molten carbonate can be used in the range of from about 500° C. to about 700° C. The operating ranges can be increased and/or the conductivity can be improved by including ceramic particles in the liquid inorganic electrolyte.

Suitable ceramic particles include, but are not limited to, MgO, ZnO, SrO, BaO, CaO, $ZrO_2$, $Al_2O_3$, $SiO_2$, SiC, $Si_3N_4$, BN, $BaTiO_3$, or mixtures thereof. The average size of the ceramic particles is generally in the range of about 1 to about 10,000 nm. It is generally desirable to use particles at the lower end of the range, such as about 1 to about 5,000 nm, or about 1 to about 1,000 nm, or about 1 to about 500 nm, or about 1 to about 100 nm. The particles can be surface treated to increase conductivity further, if desired.

The liquid electrolyte is generally present in an amount of between about 3 to about 98 wt % and the ceramic particle phase is generally present in an amount of between about 97 to about 2 wt %, typically about 30 to about 90 wt % liquid electrolyte and about 10 to about 70 wt % ceramic particle phase, and more typically about 50 to 90 wt % liquid electrolyte and about 10 to about 50 wt % ceramic particle phase.

The colloidal electrolyte can be made by any suitable process. The particles can be mixed in the liquid electrolyte to form the colloidal electrolyte. The mixing can be done manually or using a mechanical, ultrasonic, or other type of mixer. The colloidal electrolytes can also be prepared by an in situ process in which particles are precipitated in a compatible liquid phase.

When the colloidal electrolyte is to be used in a lithium battery, the liquid electrolyte further comprises a lithium salt. Suitable lithium salts include, but are not limited to, lithium halides and complex fluorides, such as lithium hexaflurophosphate, or lithium tetrafluoroborate.

Several electrolytes used in lithium batteries maintain their fluidity down to −40° C. However, their conductivity decreases rapidly below −20° C. because ionic mobility is greatly reduced due to the increase in solution viscosity. This view is supported by the observation that below −20° C., conductivity is not very sensitive to the dielectric constant of the solvents, but is highly influenced by the solution viscosity. Therefore, it would be expected that the addition of nanosize ceramic particles to form the colloidal electrolytes would increase the solution viscosity and consequently lower the conductivity of the electrolytes. However, it was unexpectedly found that the presence of the ceramic particles actually increased the conductivity of the colloidal electrolyte compared to the conductivity of the electrolyte alone.

The invention takes advantage of the fact that the dielectric constant, k, of a nanosize ceramic is inversely proportional to temperature, i.e., k increases as temperature decreases. In some cases, such as with ferroelectric ceramics (e.g., $BiTiO_3$), there is a rapid increase in k as the temperature is reduced. The presence of such a nanosize ceramic in the vicinity of the lithium salt will enhance its dissociation. Consequently, more lithium ions will become available to carry charges. The effect is similar to the use of high dielectric constant solvents in formulating electrolytes for lithium ion batteries.

While not wishing to be bound to a particular theory, it is believed that degradation of an electrolyte in a lithium-ion battery at temperatures above 50° C. occurs through the following reaction:

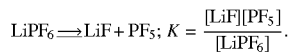

$$LiPF_6 \rightleftharpoons LiF + PF_5; K = \frac{[LiF][PF_5]}{[LiPF_6]}.$$

The colloidal electrolyte of the present invention is described in more detail by way of the following examples, which are intended to be illustrative of the invention, but are not intended to be limiting in scope.

EXAMPLE 1

The conductivity of a liquid electrolyte was compared with the conductivity of a colloidal electrolyte of the present invention. A commercially available liquid electrolyte comprising a 1:1 solvent blend of ethylene carbonate and diethyl carbonate with a molar solution of lithium hexafluorophosphate as the lithium salt was used. The density of the liquid electrolyte was about 1.27 g/cc.

The colloidal electrolyte was made by mixing the liquid electrolyte described above with about 10 wt % of $BaTiO_3$ (average particle size of about 1 μm). The mixture was stirred for about 15 minutes.

The conductivity of the liquid electrolyte and the colloidal electrolyte was determined using a three electrode cell. The electrodes were made of stainless steel with a surface area of about 1.99 cm². The gap between the electrodes was about 0.02 cm.

Figure 2:
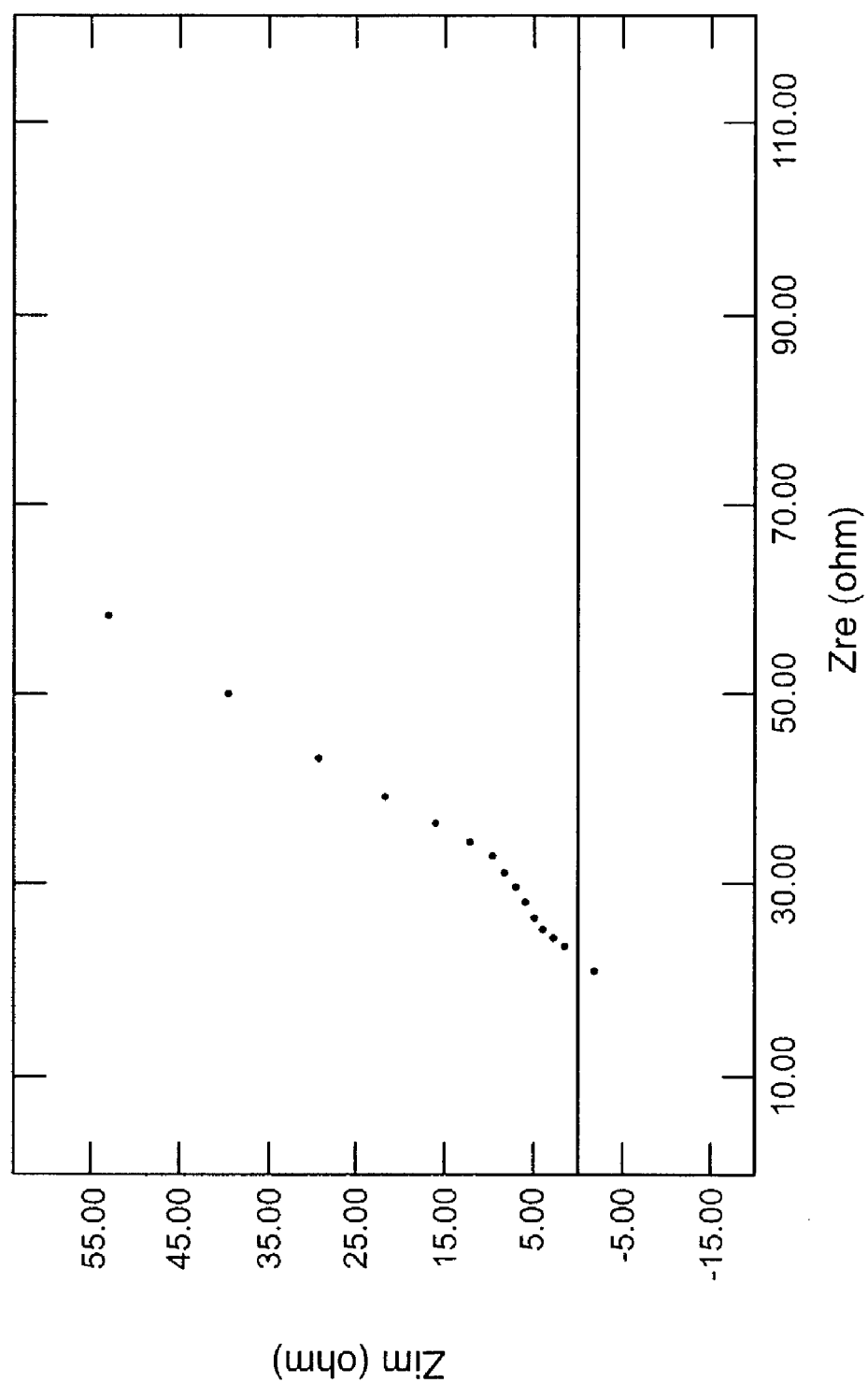
FIG. 2 is a graph showing the complex impedance plot of a liquid electrolyte at 20° C.
Figure 3:
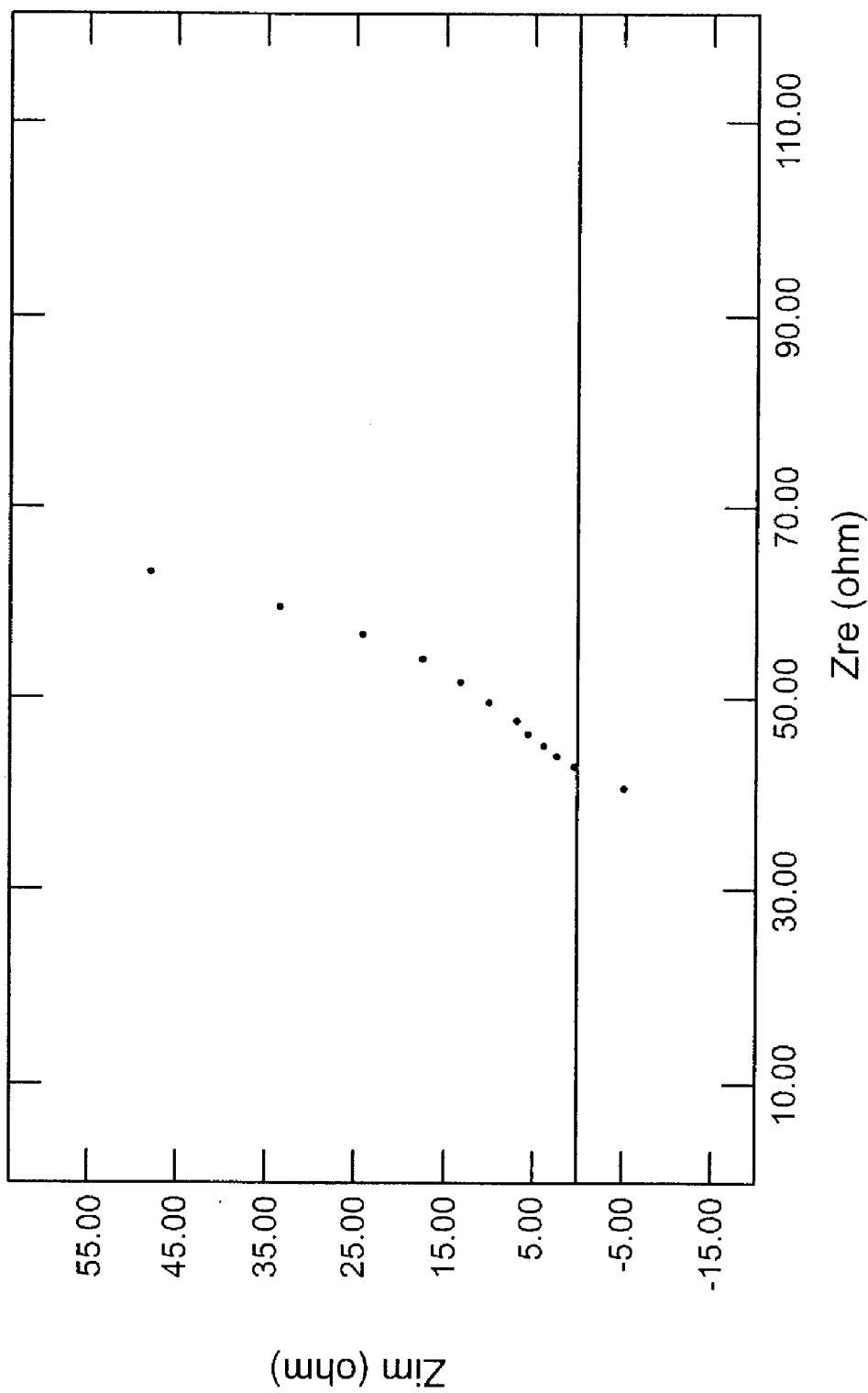
FIG. 3 is a graph showing the complex impedance plot of a liquid electrolyte at −20° C.

The resistance of the liquid electrolyte and the colloidal electrolyte was measured. The resistance of the liquid electrolyte at a temperature of 20° C. and −20° C. are shown in FIGS. 2 and 3, respectively. The conductivity of the electrolyte was calculated from the resistance using the geometric parameters of the cell. The conductivity of the liquid electrolyte was 0.86 mScm$^{-1}$ at −20° C., while the conductivity of the liquid electrolyte at 20° C. was 1.46 mScm$^{-1}$.

Figure 4:
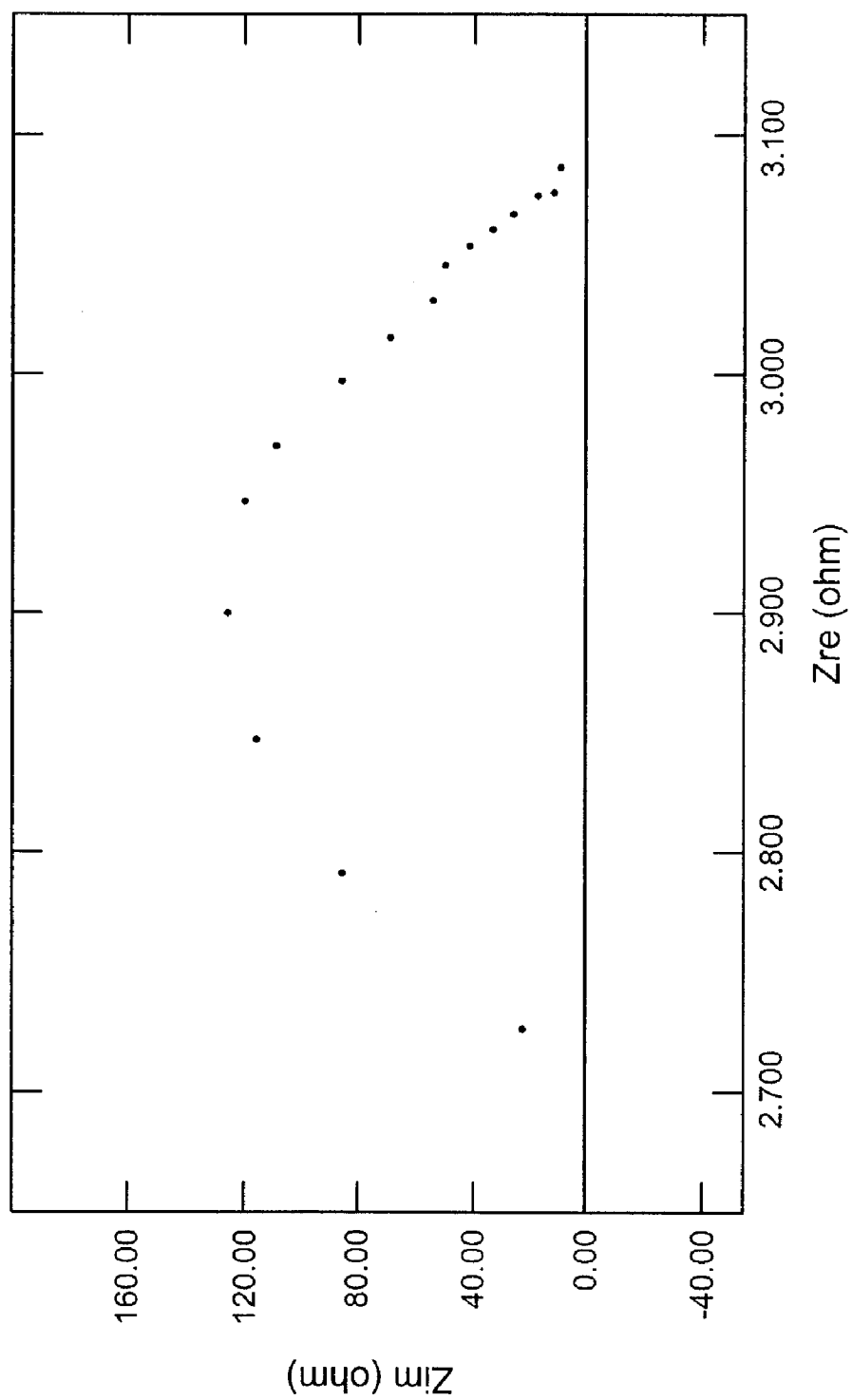
FIG. 4 is a graph showing the complex impedance plot of a colloidal electrolyte at 20° C.

The resistance of the colloidal electrolyte is shown in FIG. 4. The conductivity of the colloidal electrolyte containing BaTiO$_3$ particles at 20° C. was 12.7 mScm$^{-1}$, which is about nine times greater than the conductivity of the liquid electrolyte without the BaTiO$_3$.

Figure 5:
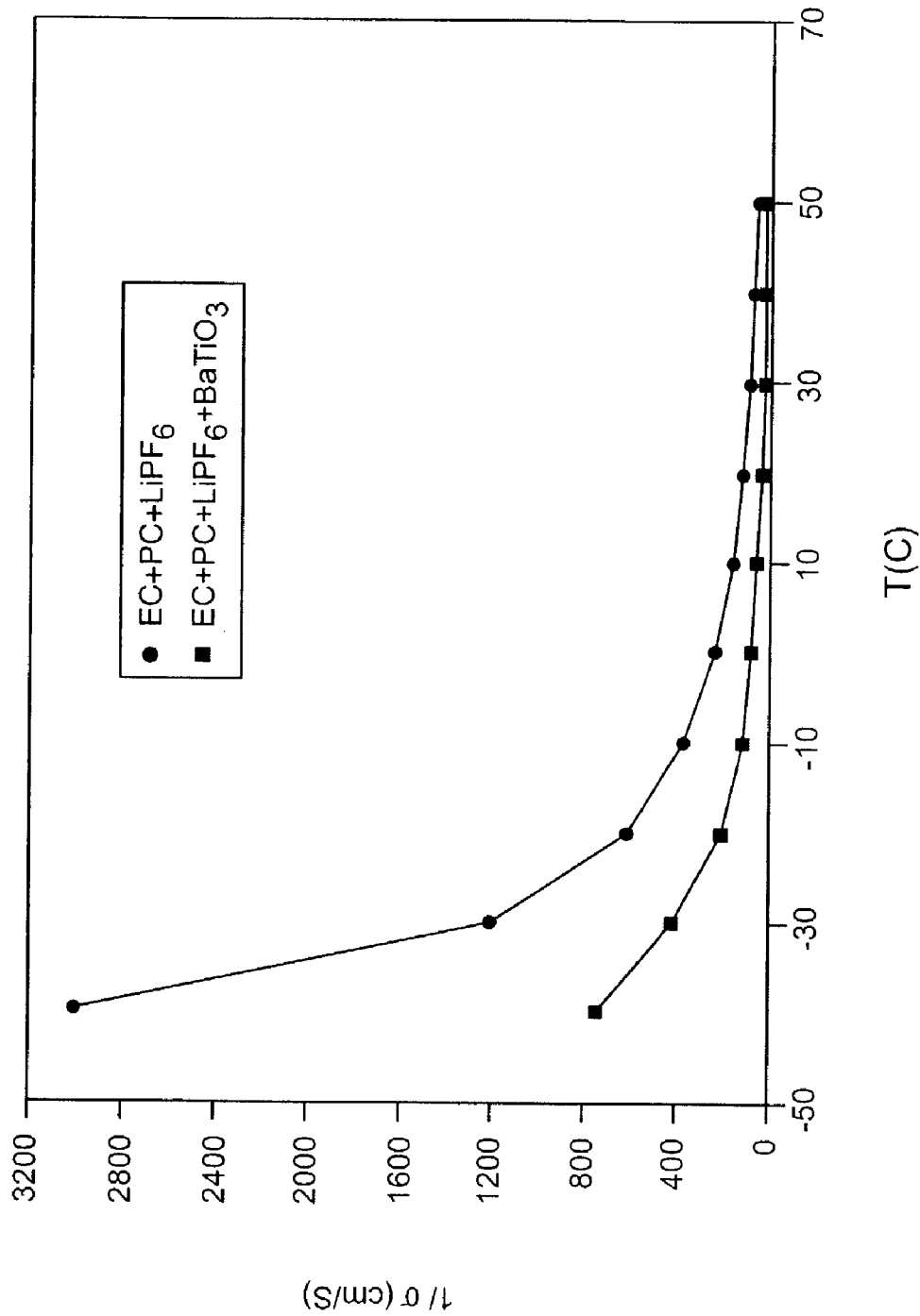
FIG. 5 is a graph comparing the resistivity of a liquid electrolyte and a colloidal electrolyte containing $BaTiO_3$ particles.

The electrolyte-electrode interface resistance for the liquid electrolyte was approximately 100 kΩ at −20° C. and 1.1 Ω at 20° C. A comparison of the resistivity of the liquid electrolyte and the colloidal electrolyte containing 10 wt % of BaTiO$_3$ is shown in FIG. 5.

EXAMPLE 2

A liquid electrolyte comprising a 1:1 solvent blend of ethylene carbonate, and polypropylene carbonate with a molar concentration of lithium hexafluorophosphate was made. The density of the liquid electrolyte was about 1.25 g/cc.

The colloidal electrolyte was formed by mixing the liquid electrolyte described above with 10 wt % Al$_2$O$_3$ (average particle size of about 24 nm).

Figure 6:
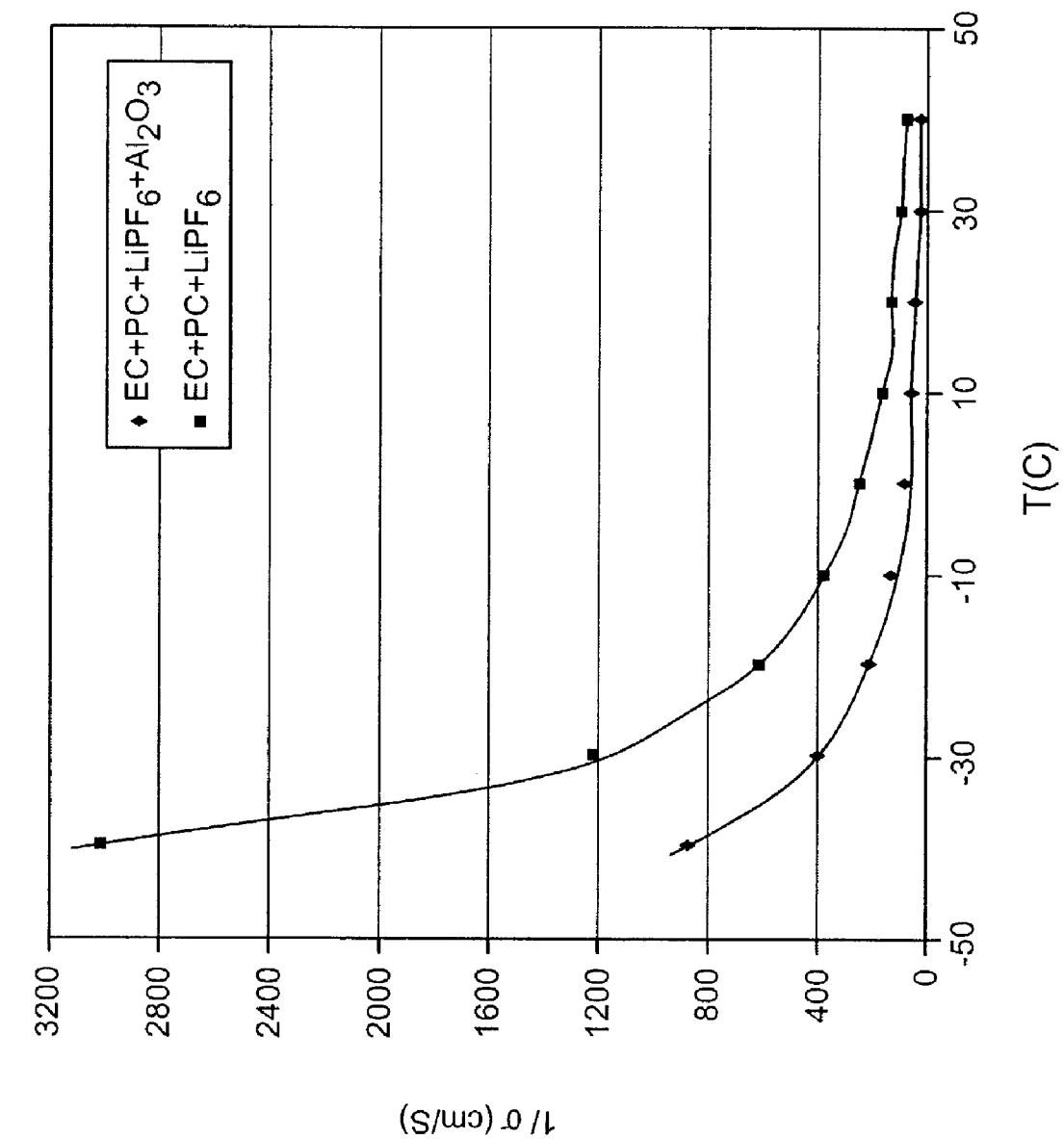
FIG. 6 is a graph comparing the resistivity of a liquid electrolyte and a colloidal electrolyte containing $Al_2O_3$ particles.

The resistance of the liquid electrolyte and the colloidal electrolyte was measured using a two electrode cell. The electrodes were made of stainless steel with a surface area of about 0.44 cm² and a gap of 0.96 cm. The electrodes were inserted through one port in a glass container. The electrolyte was poured into a second port, submerging the electrodes. The ports were then sealed, and the test was run. The results are shown in FIG. 6.

The conductivity was then calculated. The table below summarizes the results, including the temperature at which the conductivity was measured, the conductivity of the liquid electrolyte, the conductivity of the colloidal electrolyte, and the ratio of the conductivities.

| Temperature (° C.) | Liquid Electrolyte ($\sigma_l$) (mScm$^{-1}$) | Colloidal Electrolyte ($\sigma_c$) (mScm$^{-1}$) | $\sigma_c/\sigma_l$ |
| --- | --- | --- | --- |
| −40 | 0.33 | 1.15 | 3.48 |
| −30 | 0.82 | 2.48 | 3.02 |
| −20 | 1.64 | 4.64 | 2.83 |
| −10 | 2.66 | 7.52 | 2.83 |
| 0 | 4.07 | 11.70 | 2.87 |
| 10 | 6.06 | 16.50 | 2.72 |
| 20 | 7.79 | 21.60 | 2.77 |
| 30 | 10.40 | 27.30 | 2.63 |
| 40 | 12.80 | 33.60 | 2.63 |
| 50 | 15.60 | 39.70 | 2.54 |

The results show that the colloidal electrolyte has increased conductivity compared with the conductivity of the liquid electrolyte alone. The degree of conductivity enhancement varies with temperature, and it is more pronounced at lower temperatures.

EXAMPLE 3

A liquid electrolyte comprising a 1:1 solvent blend of ethylene carbonate, and polypropylene carbonate with a molar concentration of lithium hexafluorophosphate was made. The density of the liquid electrolyte was about 1.25 g/cc.

The colloidal electrolyte was formed by mixing the liquid electrolyte described above with 10 wt % BaTiO$_3$ (average particle size of about 1 μm).

Figure 7:
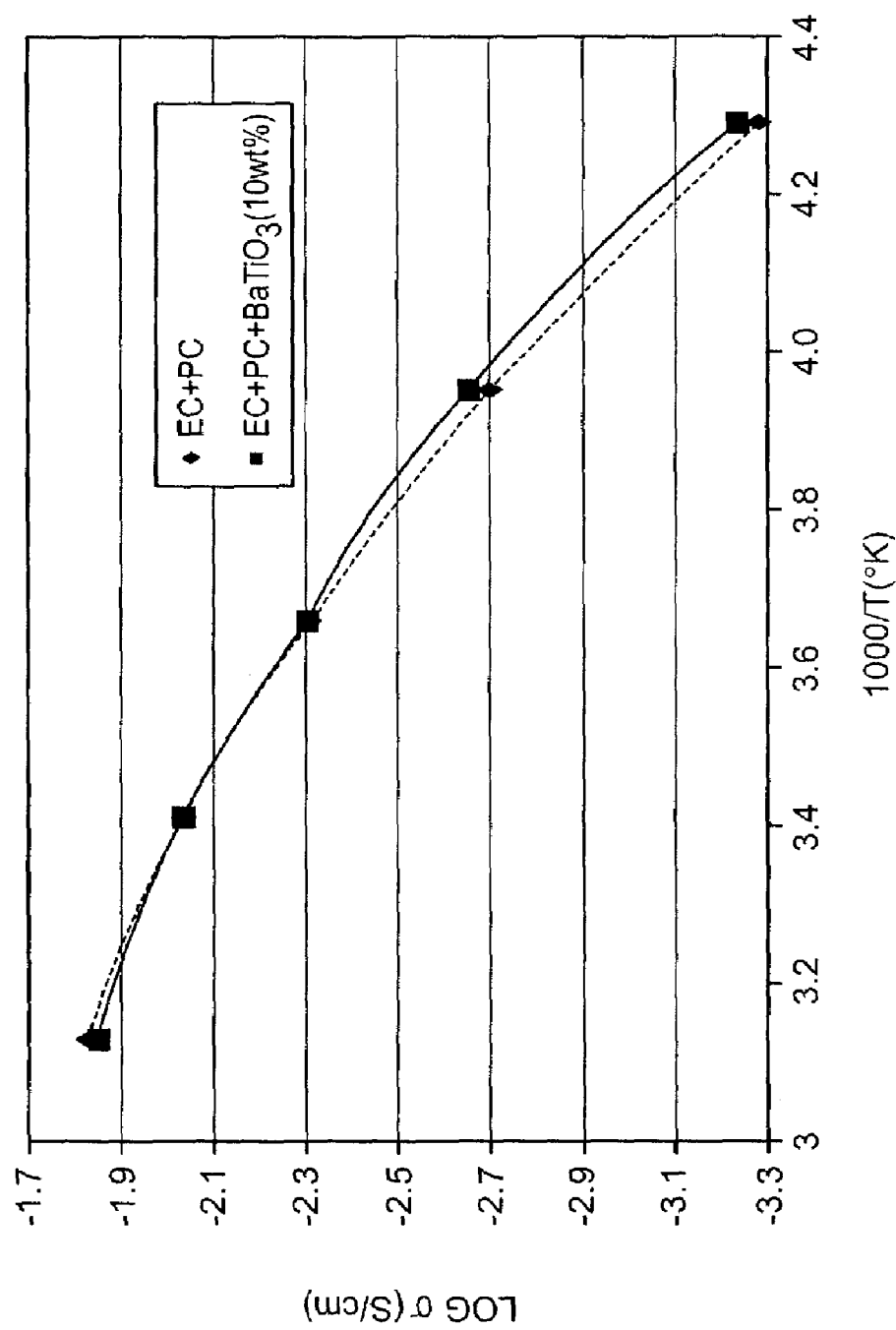
FIG. 7 is a graph comparing the conductivity of a liquid electrolyte and a colloidal electrolyte containing $BaTiO_3$ particles.

The resistance of the liquid electrolyte and the colloidal electrolyte was measured using a two electrode cell. The electrodes were made of stainless steel with a surface area of about 0.44 cm² and a gap of 0.96 cm. The electrodes were inserted through one port in a glass container. The electrolyte was poured into a second port, submerging the electrodes. The ports were then sealed, and the test was run. The conductivity was calculated, and the results are shown in FIG. 7. The colloidal electrolyte containing BaTiO$_3$ showed improved conductivity compared to the ethylene carbonate, polypropylene carbonate, lithium hexafluorophosphate liquid electrolyte.

EXAMPLE 4

A liquid electrolyte comprising a 1:1 solvent blend of ethylene carbonate, and polypropylene carbonate with a molar concentration of lithium tetrafluoroborate was made. The density of the liquid electrolyte was about 1.25 g/cc.

Two colloidal electrolytes were formed by mixing the liquid electrolyte described above with 10 wt % BaTiO$_3$ (average particle size of about 1 μm), and with 10 wt % Al$_2$O$_3$ (average particle size of about 24 nm).

A microporous separator material was soaked in the electrolyte (liquid or colloidal) for several hours and then used. The microporous separator material was a copolymer of tetrafluoroethylene and ethylene in the form of a 100 μm thick film.

Figure 8:
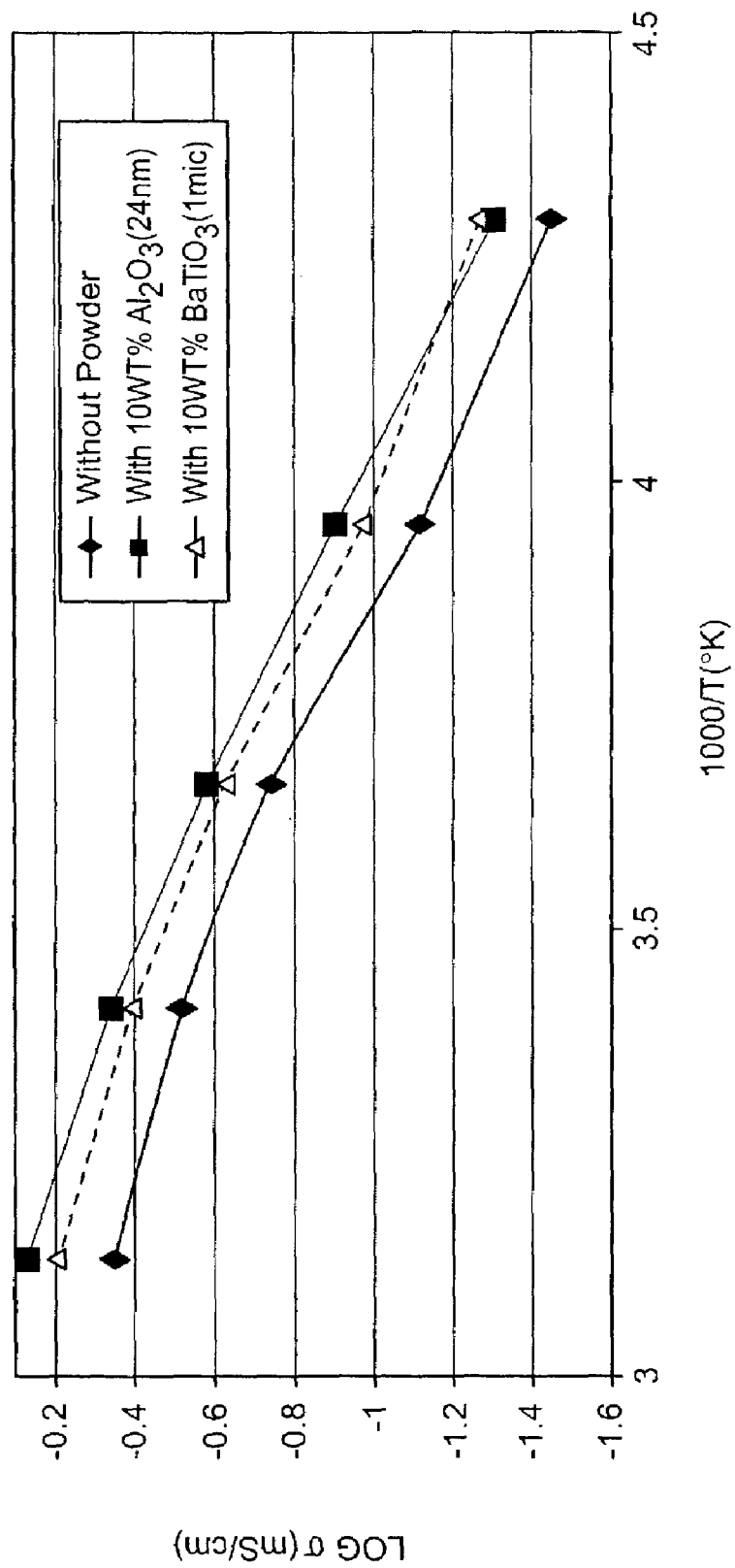
FIG. 8 is a graph comparing the conductivity of a separator material impregnated with a liquid electrolyte, and a separator material impregnated with a colloidal electrolyte containing $Al_2O_3$ particles.

The resistance of the liquid electrolyte and the colloidal electrolytes was measured using a two electrode cell. The electrodes were made of stainless steel with a surface area of about 1.23 cm². The separator material was sandwiched between the two electrodes, and the electrodes were manually tightened to obtain good contact. The conductivity was calculated, and the results are shown in FIG. 8. Both colloidal electrolytes showed increased conductivity over the ethylene carbonate, polypropylene carbonate, lithium tetrafluoroborate liquid electrolyte alone. The colloidal electrolyte containing Al$_2$O$_3$ had slightly better conductivity than the one containing BaTiO$_3$.

While the invention has been described by reference to certain embodiments, it should be understood that numerous changes could be made without departing from the scope of the invention defined in the appended claims. Accordingly, it is intended that the invention not be limited to the disclosed embodiments, but that it have the full scope permitted by the language of the following claims.

What is claimed is:

1. A liquid colloidal electrolyte for an electrochemical device comprising:
    a liquid electrolyte selected from liquid organic electrolytes, or liquid inorganic electrolytes free of sulfuric acid; and
    a ceramic particle phase dispersed in the liquid electrolyte, combined to form the liquid colloidal electrolyte;

wherein the liquid colloidal electrolyte has increased conductivity in the electrochemical device compared to the conductivity of the liquid electrolyte alone.

2. The liquid colloidal electrolyte of claim 1 wherein the liquid electrolyte is a liquid organic electrolyte.

3. The liquid colloidal electrolyte of claim 2 wherein the liquid organic electrolyte comprises a lithium salt dissolved in a liquid organic solvent.

4. The liquid colloidal electrolyte of claim 3 wherein the lithium salt is selected from lithium halides or complex fluorides.

5. The liquid colloidal electrolyte of claim 4 wherein the lithium halides or complex fluorides are selected from lithium hexafluorophosphate or lithium tetrafluoroborate.

6. The liquid colloidal electrolyte of claim 3 wherein the liquid organic solvent is selected from ethylene carbonate, diethyl carbonate, polypropylene carbonate, sulfolane, dimethylsulfoxide, acetonitrile, tetrahydrofuran, or mixtures thereof.

7. The liquid colloidal electrolyte of claim 1 wherein the liquid electrolyte is a liquid inorganic material free of sulfuric acid.

8. The liquid colloidal electrolyte of claim 7 wherein the liquid inorganic material free of sulfuric acid is selected from potassium hydroxide, phosphoric acid, or molten carbonate.

9. The liquid colloidal electrolyte of claim 1 wherein an average size of the ceramic particles is in the range of about 1 to about 10,000 nm.

10. The liquid colloidal electrolyte of claim 1 wherein the ceramic particles are selected from MgO, ZnO, SrO, BaO, CaO, $ZrO_2$, $Al_2O_3$, $SiO_2$, SiC, $Si_3N_4$, BN, $BaTiO_3$, or mixtures thereof.

11. The liquid colloidal electrolyte of claim 1 wherein the liquid electrolyte is present in an amount of between about 3 to about 98 wt % and the ceramic particle phase is present in an amount of between about 97 to about 2 wt %.

12. A liquid colloidal electrolyte for an electrochemical device comprising:
    a liquid organic electrolyte containing a lithium salt; and
    a ceramic particle phase dispersed in the liquid electrolyte, combined to form the liquid colloidal electrolyte;
    wherein the liquid colloidal electrolyte has increased conductivity in the electrochemical device compared to the conductivity of the liquid organic electrolyte alone.

13. The liquid colloidal electrolyte of claim 12, wherein the liquid organic electrolyte comprises a lithium salt dissolved in an organic solvent.

14. The liquid colloidal electrolyte of claim 13 wherein the organic solvent is selected from ethylene carbonate, diethyl carbonate, polypropylene carbonate, sulfolane, dimethylsulfoxide, acetonitrile, tetrahydrofuran, or mixtures thereof.

15. The liquid colloidal electrolyte of claim 13 wherein the lithium salt is selected from lithium halides and complex fluorides.

16. The liquid colloidal electrolyte of claim 15 wherein the lithium halides and complex fluorides are selected from lithium hexafluorophosphate, or lithium tetrafluoroborate.

17. The liquid colloidal electrolyte of claim 12 wherein an average size of the ceramic particles is in the range of about 1 to about 10,000 nm.

18. The liquid colloidal electrolyte of claim 12 wherein the ceramic particles are selected from MgO, ZnO, SrO, BaO, CaO, $ZrO_2$, $Al_2O_3$, $SiO_2$, SiC, $Si_3N_4$, BN, $BaTiO_3$, or mixtures thereof.

19. The liquid colloidal electrolyte of claim 12 wherein the liquid organic electrolyte is present in an amount of between about 3 to about 98 wt % and the particle phase is present in an amount of between about 97 to about 2 wt %.

20. An electrochemical device containing the liquid colloidal electrolyte of claim 1.

21. A lithium rechargeable battery containing the liquid colloidal electrolyte of claim 2.

22. An electrochemical device containing the liquid colloidal electrolyte of claim 12.

23. A lithium rechargeable battery containing the liquid colloidal electrolyte of claim 12.

24. The liquid colloidal electrolyte of claim 1 wherein the liquid electrolyte is present in an amount of between about 30 to about 90 wt % and the ceramic particle phase is present in an amount of between about 10 to about 70 wt %.

25. The liquid colloidal electrolyte of claim 1 wherein the liquid electrolyte is present in an amount of between about 50 to about 90 wt % and the ceramic particle phase is present in an amount of between about 10 to about 50 wt %.

26. The liquid colloidal electrolyte of claim 12 wherein the liquid electrolyte is present in an amount of between about 30 to about 90 wt % and the ceramic particle phase is present in an amount of between about 10 to about 70 wt %.

27. The liquid colloidal electrolyte of claim 12 wherein the liquid electrolyte is present in an amount of between about 50 to about 90 wt % and the ceramic particle phase is present in an amount of between about 10 to about 50 wt %.

* * * * *